US012043450B2

(12) United States Patent
Tseng et al.

(10) Patent No.: US 12,043,450 B2
(45) Date of Patent: Jul. 23, 2024

(54) ROLL OF SEPARABLE BAGS AND METHOD OF MANUFACTURE

(71) Applicant: Inteplast Group Corporation, Livingston, NJ (US)

(72) Inventors: Pai-Mei Tseng, Somerset, NJ (US); Jyh-Yao Raphael Li, Parsippany, NJ (US)

(73) Assignee: INTEPLAST GROUP CORPORATION, Livingston, NJ (US)

(*) Notice: Subject to any disclaimer, the term of this patent is extended or adjusted under 35 U.S.C. 154(b) by 0 days.

(21) Appl. No.: 17/822,379

(22) Filed: Aug. 25, 2022

(65) Prior Publication Data

US 2024/0067407 A1 Feb. 29, 2024

(51) Int. Cl.

*B65D 33/00* (2006.01)
*B31B 70/86* (2017.01)
*B31B 70/94* (2017.01)
*B65D 33/08* (2006.01)
*B31B 155/00* (2017.01)
*B31B 170/10* (2017.01)

(52) U.S. Cl.

CPC .......... *B65D 33/002* (2013.01); *B31B 70/872* (2017.08); *B31B 70/946* (2017.08); *B65D 33/08* (2013.01); *B31B 2155/003* (2017.08); *B31B 2170/10* (2017.08)

(58) Field of Classification Search

CPC .... B65D 33/002; B65D 33/08; B31B 70/872; B31B 70/946; B31B 2170/10; B31B 2155/003
USPC .......................................................... 383/10
See application file for complete search history.

(56) References Cited

U.S. PATENT DOCUMENTS 3,217,971 A * 11/1965 Shvetz ................. B65D 33/165 383/203
3,774,838 A * 11/1973 Christie ............. B65D 33/1608 383/62
3,865,303 A 2/1975 Korn
3,961,743 A 8/1976 Hollowell
5,041,317 A 8/1991 Greyvenstein
(Continued)

FOREIGN PATENT DOCUMENTS

FI 58753 B * 12/1980
KR 20030063742 A * 7/2003
(Continued)

OTHER PUBLICATIONS

Machine translation of KR-20030063742-A.*
Machine translation of KR-20120008255-A.*

*Primary Examiner* — Jes F Pascua
(74) *Attorney, Agent, or Firm* — Stinson LLP

(57) ABSTRACT

A roll of separable bags which leaves no scrap material and method of making a roll of separable bags which leaves no scrap material is disclosed herein. An elongated tube of material having a length and a width is laid flat, forming a web of material. The web of material comprises an outer and an inner sheet portion. First and second seals are formed widthwise across the outer and inner sheet portions. First and second bag separating perforation lines are formed widthwise across the outer and inner sheet portions. A user may tear one bag away from the roll of bags by using the bag separating perforation line. The user may then deploy the handles of the bag by tearing along the handle perforation lines.

19 Claims, 4 Drawing Sheets

(56) References Cited

U.S. PATENT DOCUMENTS

| | | | |
|---|---|---|---|
| 5,355,788 | A | 10/1994 | Phinney |
| 6,481,594 | B1 | 11/2002 | Yeh et al. |
| 2006/0283764 | A1 | 12/2006 | Tan |
| 2008/0063317 | A1 | 3/2008 | Tracy et al. |

FOREIGN PATENT DOCUMENTS

| | | | | |
|---|---|---|---|---|
| KR | 20120008255 | A | * | 1/2012 |
| WO | WO-9008071 | A1 | * | 7/1990 |

* cited by examiner

ROLL OF SEPARABLE BAGS AND METHOD OF MANUFACTURE

FIELD

The present disclosure generally relates to plastic bags and more particularly to a roll containing a multiplicity of separable bags.

BACKGROUND

Separable bags compiled into a stack or a roll (source) are generally known. The roll of bags is manufactured by making cutouts and perforations in a web of material. This process has heretofore generally produced a substantial amount of waste material from the web. For example, to form the opening in the bag, a sometimes large area of the web is removed during production. The scrap generated builds up quickly and can interfere with the manufacturing process by fouling machinery and simply requiring a halt of operation to remove. As a result, the production of bags is made inefficient and wasteful of material.

SUMMARY

In one aspect, a roll of separable bags comprises an outer sheet portion having a length, a width and opposite longitudinal edges. An inner sheet portion connected to the outer sheet portion has a length, a width and opposite longitudinal edges. The inner sheet portion is arranged in the roll generally opposite to the outer sheet portion. A first seal extends widthwise of and interconnects the outer and inner sheet portions, and a second seal extends widthwise of and interconnects the outer and inner sheet portions. The second seal is spaced lengthwise of the outer and inner sheet portions from the first seal. A first bag separating perforation line extends widthwise of the outer and inner sheet portions and is configured to separate a bag from the roll of separable bags by tearing the bag separating perforation line. The first bag separating perforation line is located closer to the first seal than to the second seal. A second bag separating perforation line extends widthwise of the outer and inner sheet portions and is configured to separate another bag from the roll of separable bags by tearing the second bag separating perforation. The second bag separating perforation line is located closer to the second seal than to the first seal. A handle perforation line includes a first segment that begins at a start location nearer to one of the longitudinal edges of the outer and inner sheet portions than the other of the longitudinal edges of the outer and inner sheet portions. The handle perforation line includes the first segment which extends from the start location generally toward the other of the longitudinal edges of the outer and inner sheet portions. A second segment extends from the first segment remote from the start location. The second segment extends generally lengthwise of the outer and inner sheet portions and intersects the first bag separating perforation line. A handle for the bag can be formed from the outer and inner sheet portions by tearing the first bag separating perforation line, and by tearing the handle perforation line.

In another aspect, a method of forming a web of separable bags comprises forming a tube from a polymeric material having a length and a width. The tube includes an outer sheet portion and an inner sheet portion generally opposite the outer sheet portion. The outer and inner sheet portions including opposite longitudinal edges. The method further comprising forming seals extending widthwise across the outer and inner sheet portions at locations spaced apart longitudinally of the tube. The method further comprising perforating the tube in a widthwise direction to form bag separating perforation lines at locations spaced apart longitudinally of the tube. The method further comprising perforating the tube to form handle perforation lines distinct from the bag separating lines. One of the handle perforation lines and one of the bag separating perforation lines together define a handle formed by tearing the handle perforation line and the bag separating perforation line.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
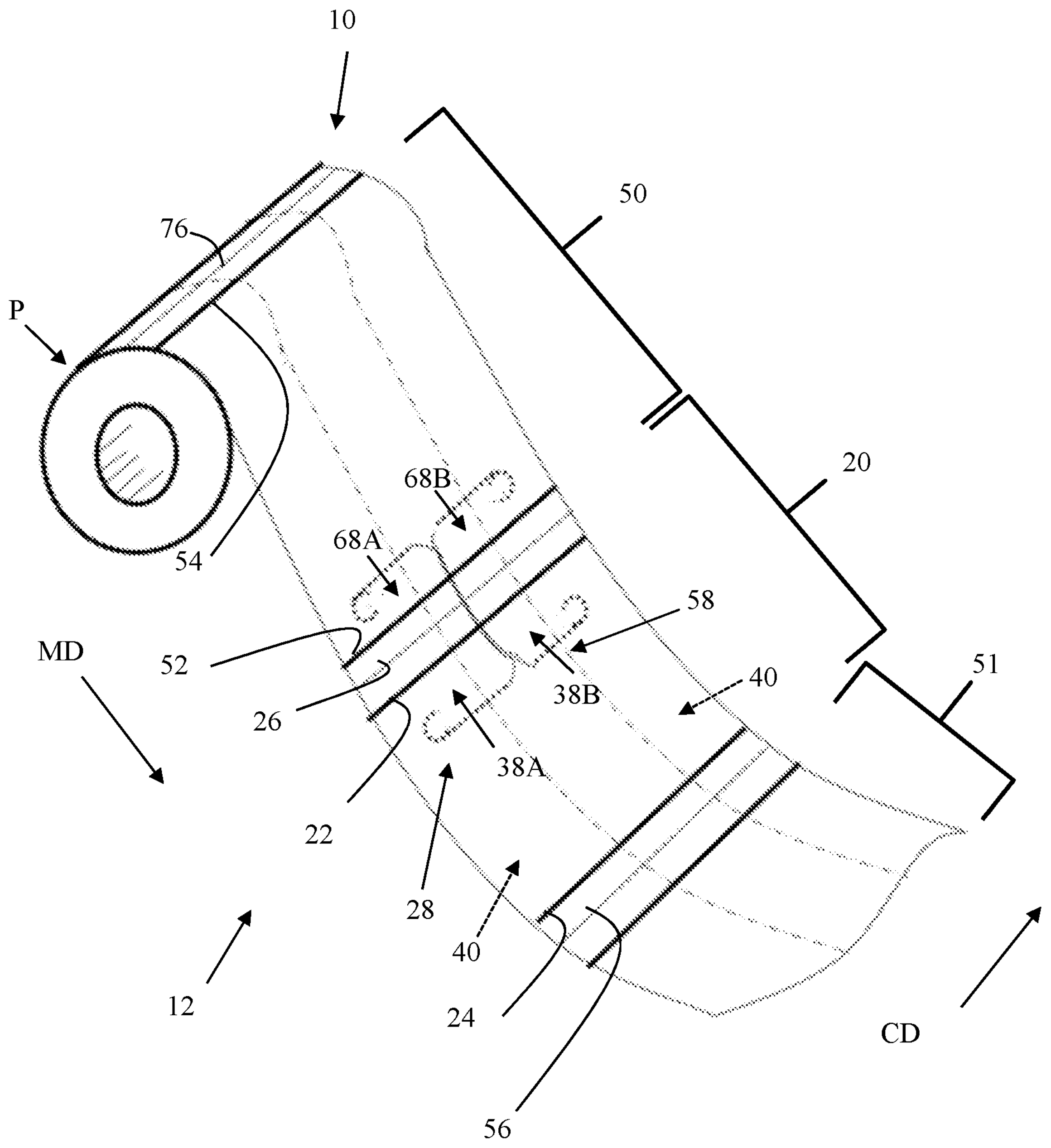
FIG. 1 is a schematic illustration of a perspective of a roll of separable bags and a web extending from the roll.
Figure 2:
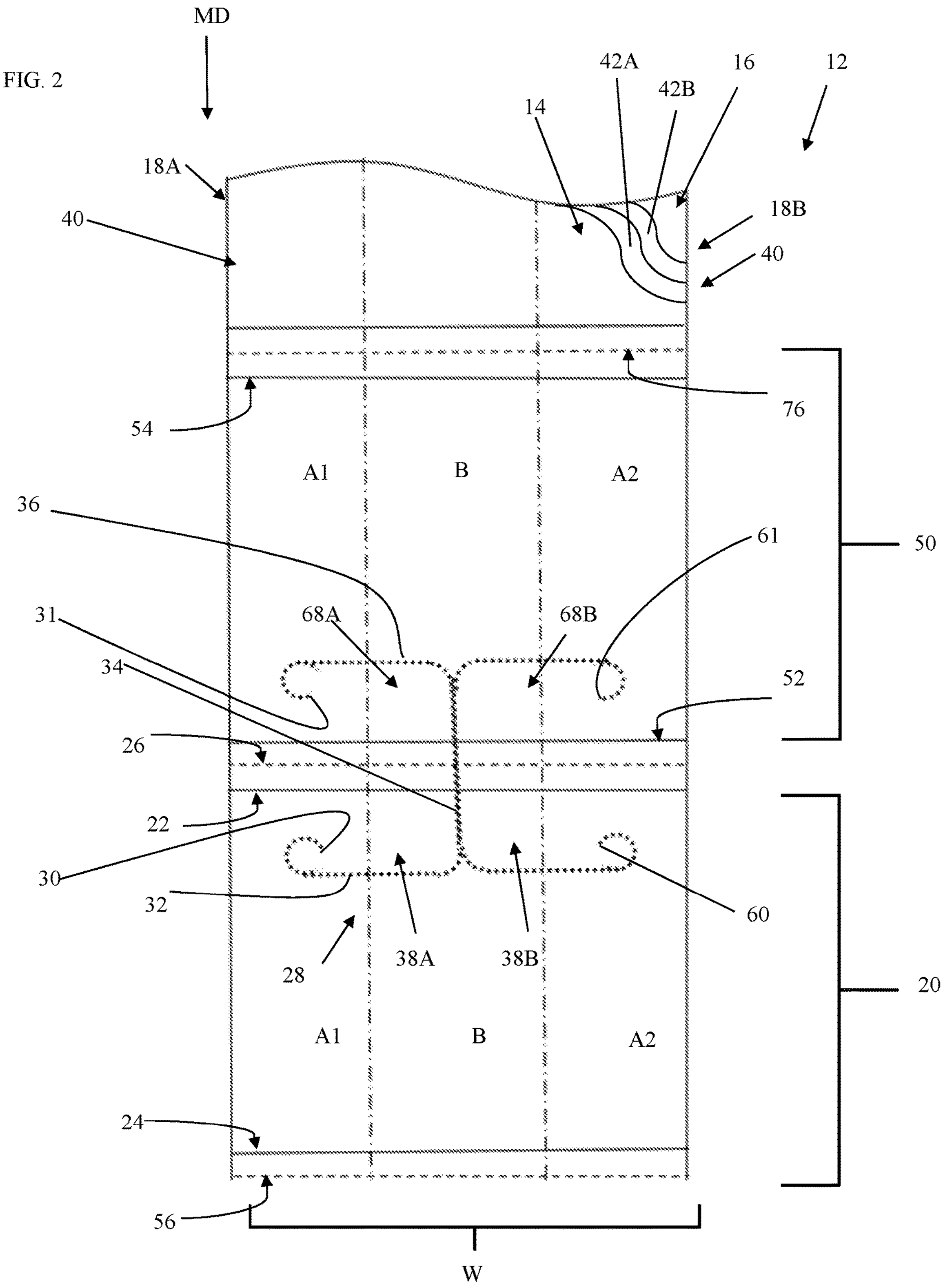
FIG. 2 is a front elevation of a fragmentary portion of the web.

Referring to FIG. 1, a roll 10 containing a multiplicity of separable bags is shown, with a fragmentary portion of the web 12 extending from the roll. The web 12 has a machine direction MD (indicated by an arrow) parallel to the length of the web 12 and a cross machine direction CD (indicated by arrow) perpendicular to the machine direction. The fragment of the web shown includes a first bag 20, a second bag 50 and part of a third bag 51. The web 12 comprises a tube formed from a sheet of polymeric material (e.g., polyethylene) that is folded over onto itself and joined along one longitudinal edge. As configured in the roll 10 and in the web, the tube is folded or laid flat. In the illustrated embodiment, a gusset 40 is formed on each side of the tube. Typically, the gussets 40 are formed after the tube is created. Referring now also to FIG. 2, as laid flat, the tube includes an outer sheet portion 14 and an inner sheet portion 16 generally opposite the outer sheet portion 14. The gussets 40 are folded between the outer and inner portions about respective gusset fold lines which are illustrated as longitudinally extending dashed lines on the web. An upper, right-hand corner of the web 12 is broken back in FIG. 2 to reveal the inner sheet portion and gusset members 42A, 42B. The gussets 40 each include gusset members 42A, 42B connected to each other at the gusset fold line and lying face to face upon each other in the laid flat condition of the tube. The outer sheet portion 14 lies against one of the gusset members 42A, 42B along each longitudinal edge margin 18A (left), 18B (right), of the web 12 and the inner sheet portion 16 lies against the other one of the gusset members 42A, 42B along each longitudinal edge margin. In the middle (i.e., between the gusset fold lines), the outer sheet portion 14 and inner sheet portion 16 lie against each other. It will be appreciated that other arrangements of the tube and web may be used within the scope of the present invention. For example, and without limitation, the gussets could be eliminated and/or the tube could be formed by attaching two or more sheets together along plural longitudinal seams (not shown). In some embodiments, a tube of polymeric film can be formed using a blown film process that does not leave any seam in the tube.

The first and second bags 20, 50, are separable from one another and from the web 12 by tearing along a first bag separating perforation line 26. A second bag separating perforation line 56 is located at an opposite longitudinal end of the first bag 20. As used herein "longitudinal" refers to the machine direction MD. A third bag separating perforation line 76 and other bag perforation lines are also present for separation of other bags. A first seal 22 extends widthwise of the web 12 (i.e., in the cross machine direction) near the end of the first bag 20 adjacent the first bag separating perforation line 26. A second seal 24 extends widthwise of the web near the second bag separating perforation line 56. Each of the first and second seals 22, 24, interconnects and seals together the outer sheet portion 14 and the inner sheet portion 16. More specifically, each of the first and second seals 22,24, sealingly joins together the outer sheet portion 14, the inner sheet portion 16, and the gusset members 42A, 42B where those components overlie each other. The second seal 24 forms the closed bottom of the first bag. The first seal 22 is located near the top of the first bag 20. A third seal 52 associated with the second bag 50 is located near the first seal 22, just on the opposite longitudinal side of the first bag separating perforation line 26. A fourth seal 54 on the opposite longitudinal end of the second bag 50 from the third seal 52 forms the closed bottom of the second bag 50. It will be appreciated that as separated from the web 12, the top of the first bag 20 remains closed by the first seal. As explained more fully below, the arrangement of seals and perforations allows a user to tear along the bag separating perforation line (e.g., line 26) to separate an individual bag (e.g., first bag 20) from the roll 10, then tear along handle perforation lines 28, 58 to form handles 38A, 38B (broadly, at least one handle) of the bag. Forming the handles 38A, 38B in this manner also has the effect of opening the top of the first bag 20 so that items can be placed in the first bag through the top. The arrangement of seals and perforations yields no scrap material that may come from a bag or the roll. Once removed from the roll, the individual bag can be used for lining a trashcan, as carryout bag, for holding items, etc.

The outer and inner sheet portions 14, 16 have respective interior and exterior surfaces. The interior surfaces face the inside of the bag and the exterior surfaces face outward from the bag, when the bag is fully opened up for receiving articles. The gusset members 42A, 42B also have interior and exterior surfaces 42A, 42B. In the laid flat position, the interior surfaces generally loosely contact each other (away from the first and second seals) and are reasonably easily separable for the user to configure the first bag from the in flat position to the operative position. The interior surfaces may be treated so the bags are less likely to adhere to one another when the user separates an individual bag from the roll. The gusset members 42A, 42B at least partially unfold from each other to reach the open, operative position of the first bag thereby increasing the volume of the interior of the first bag. In an operative position, the interior surfaces of the inner and outer sheet portions 14, 16 face each other and form, in part, interior walls of the bag.

Referring to FIG. 2, the first and second bags 20, 50, each include regions A1, B, and A2. For illustration purposes, the regions are separated by the gusset fold lines. The gusset fold lines divide the width of the web 12 generally into thirds in the illustrated embodiment. For example, the width of region A1 is about one-third the width of W, the width of region B, is about one-third the width of W, and the width of A2 is one third the width of W (schematically shown, FIG. 2). The regions A1 and A2 are the portions of the web that include the gussets 40. Region B is between the gussets 40, where the outer sheet portion 14 and inner sheet portion 16 face each other without any intervening structure. It will be understood that the regions A1, B and A2 are defined for convenience in the description of the first and second bags of the illustrated embodiment. It will be understood that other configurations, relative sizes and composition of the regions may be used within the scope of the present invention.

Figure 3:
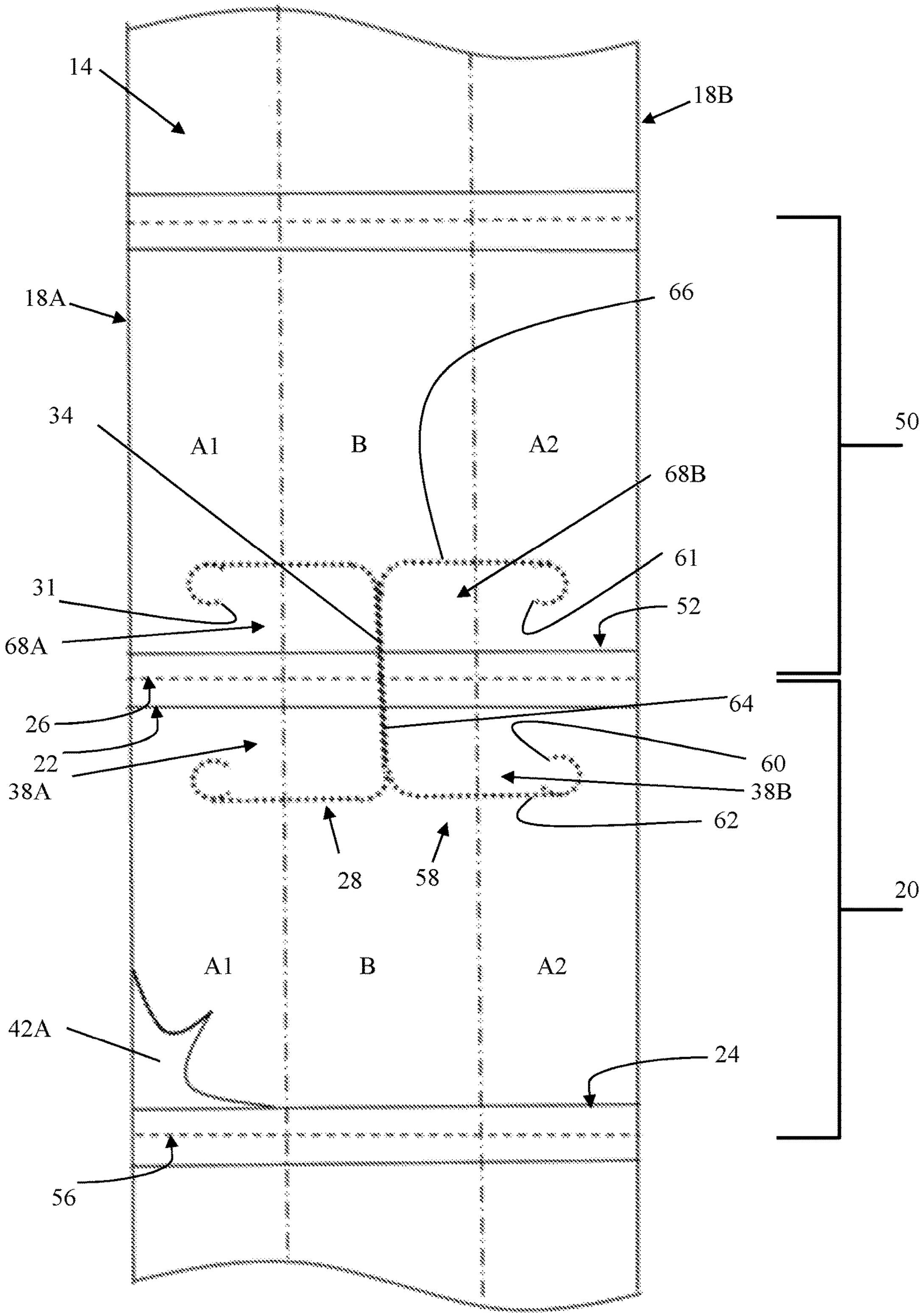
FIG. 3 is a front elevation of the fragmentary portion of the web with parts broken away to show underlying structure.

The bags, including the first and second bags 20, 50, are formed with handles 38A, 38B, 68A, 68B (broadly, at least one handle) that can be deployed after the bag is separated from the web, (FIG. 3). Referring again specifically to the first bag 20, the handles 38A, 38B, are initially defined within the perimeter of the first bag 20. The perimeter of the first bag 20 is understood as being formed by the opposite longitudinal edges, the first bag separating perforation line 26 and the second bag separating perforation line 56. A first of the two handles 38A of the first bag 20 is defined in part by a first handle perforation line 28. The first handle perforation line 28 begins at a start location 30 that is located nearer to the left longitudinal edge 18A of the inner and outer sheet portions than to the right longitudinal edge 18B. A first segment 32 of the first handle perforation line 28 extends from the start location 30 in region A1 generally toward the opposite (right) longitudinal edge 18B of the bag. However, from the start location 30 the first segment 32 initially extends generally toward the left longitudinal edge 18A, but curves back on itself so that the majority of the length of the first segment 32 extends widthwise of the first bag 20 toward the right longitudinal edge 18B. Near the center of the laid flat first bag (region B), the first handle perforation line 28 turns toward a lengthwise direction. At this location, a second segment 34 of the first handle perforation line 28 begins which extends lengthwise of the web over the majority of the length of the second segment. Thus, the second segment 34 extends from the first segment 32 at a location which is remote from the start location 30.

In the illustrated embodiment, the first handle perforation line 28 forms not only a portion of the first handle 38A of the first bag 20, but forms part of a first handle 68A of the second bag 50. It will be understood that other arrangements in which the handles of the distinct first and second bags are formed by distinct perforation lines may also be used. However, in the illustrated embodiment, the first handle perforation line 28 forms both the first handles 38A, 68A of the first and second bags 20, 50. It will be noted that the longitudinal edge of the first bag 20 at the closed bottom of the bag (formed by the second seal 24) is free of any perforations for forming handles. Similarly, the second bag 50 is free of any perforations for forming handles at the longitudinal end of the bag where the fourth 54 seal is located. In the illustrated embodiment, all of the separable bags in the roll are formed in pairs having the constructions of the first and second bags 20, 50.

The second segment 34 extends intersects and extends across the first seal 22, the first bag separating perforation line 26 and the third seal 52 located on the second bag 50. At an end of the second segment 34 remote from its intersection with the first segment 32, the second segment 34 turns toward the left longitudinal edge 18A of the web and becomes a third segment 36. The third segment 36 is shown as being a mirror image of the first segment 32. Like the first segment 32, the third segment 36 begins at a start location 31 nearer to the left longitudinal edge 18A of the web than to the right longitudinal edge 18B. The start location 31 of the third segment 36 (which could also be considered an end location of the first handle perforation line) is located in region A1 of the second bag 50, and is on the longitudinally opposite side from the start location 30 of the first segment 32. The third segment 36 extends from the start location 31 initially toward the left longitudinal edge of the web, but then turns back upon itself so that the majority of the length of the third segment 36 extends widthwise of the web toward the right longitudinal edge. As previously described, the third segment 36 intersects the second segment 34 in region B.

Referring to FIG. 3, the first and second bags 20, 50 have respective second handles 38B, 68B, that are formed in part by a second handle perforation line 58. The second handle perforation line 58 is substantially a mirror image of the first handle perforation line 28. The second handle perforation line 58 comprises a start location 60 located in region A2 of the first bag 20 on the opposite longitudinal side of the web from the start location 30 of the first handle perforation line 28. The second handle perforation line 58 further includes respective first, second, and third segments, 62, 64, 66, and a start location 60. The second handle perforation line 58 can be said to begin at the start location 60, which is nearer to the first seal 22 than the second seal 24. The first segment 62 of the second handle perforation 58 line initially extends toward the right longitudinal edge 18B, but then turns back upon itself so that a majority of the length of the first segment extends in the cross machine (widthwise) direction of the outer and inner sheet portions from region A2 into region B. Near the center of the laid flat first bag (region B), the first segment 62 begins to turn toward the machine direction and merges into a second segment 64 of the second handle perforation line 58. The second segment 64 extends across the first seal 22, across the first bag separating perforation line 26, and across the third seal 52 into region B of the second bag 50. From the B region where the second segment 64 leaves off, the third segment 66 begins as it turns rightward in the cross machine direction toward the right longitudinal edge 18B. The start location 61 on the third segment 66 (which could also be understood as being an end location of the second handle perforation line 58) is located on an opposite side of the outer and inner sheet portions from the start location 31 of the third segment 36 of the first handle perforation line 28. The start location 61 of the third segment 66 of the second handle perforation line 58 is also on the opposite side of the first bag separating perforation line 26 from the start location 60 of the first segment 62 of the second handle perforation line 58. The third segment 66 of the second handle perforation line 58 extends toward the left longitudinal edge 18A of the web and intersects the second segment 64 in region B on the second bag 50. It is appreciated that the second segment 64 of the second handle perforation line 58 and the second segment 34 of the first handle perforation line 28 at least partially overlie each other (broadly, "coincide"). Desirably, the second segments 34 and 64 fully coincide which assists when separating the handles without creating debris.

In the illustrated embodiment, the seals and perforations extend through the gussets 40. The handle perforation lines are generally linear, however the perforation lines may be non-linear (e.g. wavy, ruffled, sinusoidal, etc.). Moreover, in the illustrated embodiment, rounded portions are formed where the first segments transition to the second segments and where the second segments transition to the third segments. However, any suitable transition may be used without departing from the scope of this disclosure.

Figure 4:
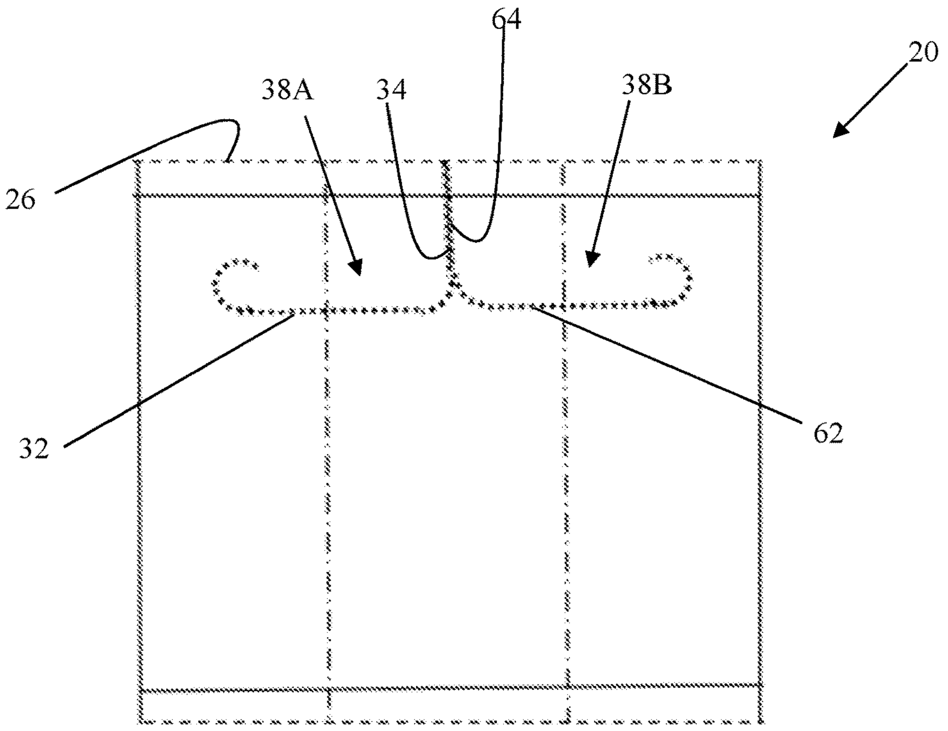
FIG. 4 is a schematic illustration of a front elevation of an individual bag with handle perforations intact.

Referring to FIG. 1, to separate the first bag 20 from the roll 10, the user may grip with a finger and thumb of one hand the second bag 50 of the roll, preferably at a location near the first bag separating perforation line 26, for example, near the third seal 52. With a finger and thumb of the other hand, the user grips the first bag 20 at a location near the first bag separating perforation line 26, for example, near the first seal 22. The user then tears the first bag 20 away from the second bag 50 at said first bag separating perforation line 26 resulting in the first bag 20 being separated from the web and roll, as seen in FIG. 4. Other ways of tearing the first bag from the web are possible. When the first bag 20 is separated from the roll, the first and second handle perforations 28, 58, are split in half along the first bag separating perforation line 26 such that the bottom halves of the first and second handle perforation lines 28, 58 form first and second handles 38A, 38B of the first bag and the top halves form first and second handles 68A, 68B of the second bag 50. Referring back to the roll 10, once the first bag 20 is torn away from the roll 10, the handles 68A, 68B, of the second bag 50 are now at a distal end of the web and the fourth seal 54 (bottom closure) of the second bag 50 is proximal and adjacent to a bottom seal of a preceding (third) bag in the roll, shown in part and indicated as P in FIG. 1. To remove the second bag 50 from the roll, the user repeats the process as described above by first exposing (drawing from the roll) the preceding bag P, then pinching the preceding bag P, and pinching and tearing the second bag 50 from the preceding bag P. Of course, the pinching sequence may be performed vice versa and the first and second bags may be pinched at locations other than described.

Figure 5:
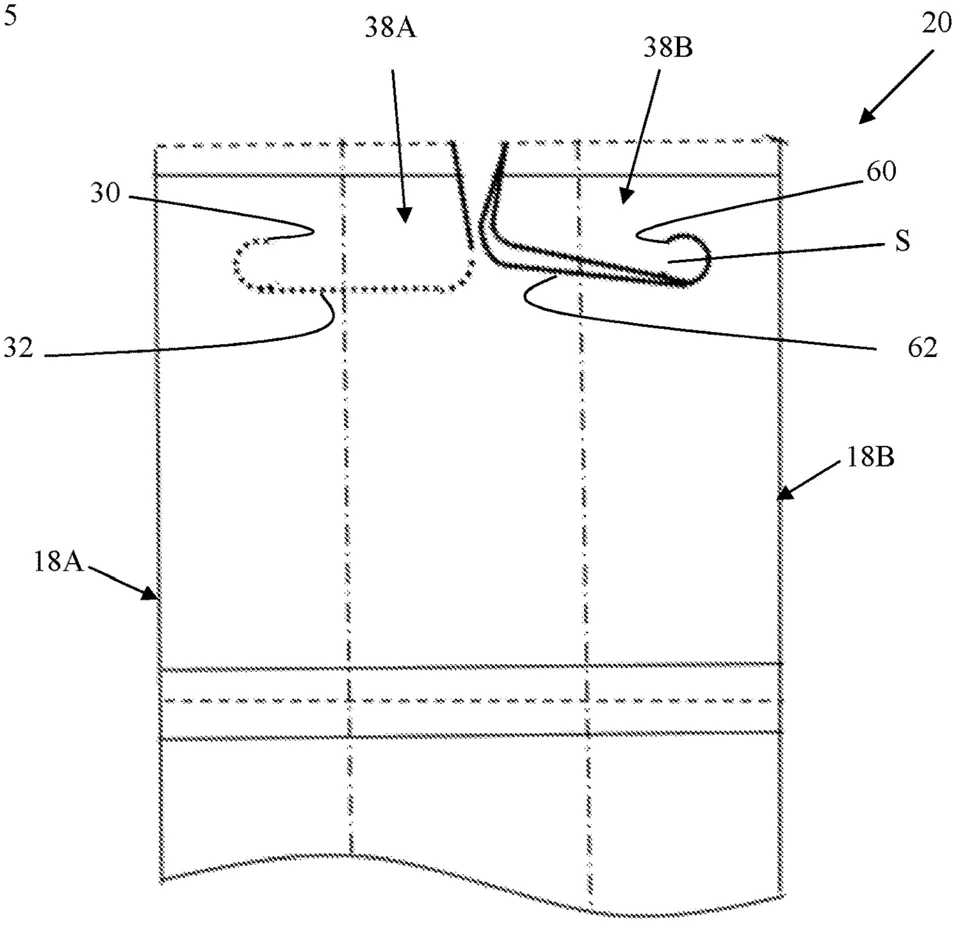
FIG. 5 is a schematic illustration of a front elevation of the individual bag of with the handle perforations separated in part.

Referring to FIGS. 4 and 5, the user may deploy the handles from the separated first bag 20 by gripping with a finger and thumb of one hand an area of one handle 38A or 38B and pinching with a finger and thumb of the other hand an area the other handle 38A or 38B. The user can then pull the handles 38A, 38B away from each other in a tearing motion starting at the upper edge of the first bag 20. The tear will follow the first and second handle perforation lines 28, 58, through the conjoint second segments 34,64 and then split off to the respective first segments 32, 62, toward respective left and right longitudinal edges 18A, 18B. The tear curls back onto itself as it approaches respective start locations 30,60. The first and second handles 38A, 38B will remain intact with the bag via the material between the start locations 30, 60 and the top edge of the first bag 20. A mouth of the first bag 20 is formed when the handles are torn along the first segments 32, 62. It will be understood from the foregoing description that each of the first and second handles is defined in part by a respective one of the first and second handle perforation lines, and further defined in part by the first bag separating perforation line.

Once pulled away from each other, each of the first and second handles 38A, 38B of the first bag 20 includes a proximal end portion adjoining the rest of the first bag 20, and a distal end at the bottom halves of the second segments 34, 64 (where the second segments formerly coincided), near a center of the mouth of the bag. The handles 38A, 38B can be moved to a substantially vertical position for gripping and carrying the first bag 20. Lateral openings (not shown) are formed in the handles 38A, 38B by tearing of the gussets 40 along the first segments 32, 62 of the first and second handle perforation lines. The distal ends of the handles 38A, 38B may pass through lateral handle apertures in the first bag 20 to close the mouth of the bag. It has been found that the curved back perforation lines lower the likelihood of the tear undesirably propagating past the respective start locations of the handle perforation lines. Other shapes, curves, or lines that turn backward may be used in place of the curved portions of the first and second handle perforation lines without departing from the scope of the disclosure. Moreover, the starting locations of the first and second handle perforation lines may be moved more toward the center of the web to form smaller handles.

An exemplary method of manufacturing a web of separable bags will now be briefly described below. The method of manufacturing the web of separable bags comprises forming a tube of polymeric material having a length and a width. In one embodiment, the tube is formed by a blown film process. In some embodiments, one or more gussets are formed in the tube. The tube includes an inner sheet portion and an opposite outer sheet portion, the inner and outer sheet portions having opposite longitudinal edges. The method further comprises forming a plurality of seals that extend widthwise across both outer and inner sheet portions of the tube at longitudinally spaced apart locations. The tube is then perforated in a widthwise direction to form bag separating perforation lines at locations longitudinally spaced apart along the web. The tube is then perforated to include handle perforation lines. The order of forming the seals and perforations can be other than described. In one example, at least some of the seals and perforations are formed at the same time. The handle perforation line and the bag separating perforation line together define a handle formed by tearing both the handle perforation lines and the bag separating perforation line. Preferably, the handle perforation lines and bag separating line are arranged so that no scrap is produced when the bag is torn away from the web. In some embodiments, the tube can be formed with gussets which are folded on top of one another when the tube is in its laid flat condition. The handle perforation lines extend through the gussets. The handle perforation lines preferably extend across one or more seals in the web that extend widthwise (i.e., in the cross machine direction) of the tube. The seals can be formed in pairs, one on either side of a respective one of the bag separating perforation lines. The handle perforation lines are preferably curved near the location that remains connected to the remainder of the bag when the handles are otherwise separated from the bag. This arrangement facilitates inhibiting the propagation of tears extending from an end of the perforation line.

For purposes of this disclosure, terms such as "starting," "upward, "leftward," "rightward," "top," "bottom," "begins," "terminates," etc. are understood to be used in a descriptive sense and not a limiting sense.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A roll of separable bags comprising:

an outer sheet portion having a length, a width and opposite longitudinal edges;

an inner sheet portion connected to the outer sheet portion, the inner sheet portion having a length, a width and opposite longitudinal edges, the inner sheet portion being arranged in the roll generally opposite to the outer sheet portion;

a first seal extending widthwise of and interconnecting the outer and inner sheet portions;

a second seal extending widthwise of the outer and inner sheet portions, the second seal being spaced lengthwise of the outer and inner sheet portions from the first seal;

a first bag separating perforation line extending widthwise of the outer and inner sheet portions and configured for separating a bag from the roll of separable bags by tearing the bag separating perforation line, the first bag separating perforation line being located closer to the first seal than to the second seal;

a second bag separating perforation line extending widthwise of and interconnecting the outer and inner sheet portions and configured for separating another bag from the roll of separable bags by tearing the second bag separating perforation line, the second bag separating perforation line being located closer to the second seal than to the first seal;

a handle perforation line including a first segment beginning at a start location nearer to one of the longitudinal edges of the outer and inner sheet portions than the other of the longitudinal edges of the outer and inner sheet portions, the handle perforation line including the first segment extending from the start location generally toward the other of the longitudinal edges of the outer and inner sheet portions, and a second segment extending from the first segment remote from the start location, the second segment extending generally lengthwise of the outer and inner sheet portions, and intersecting the first bag separating perforation line, the second segment of the handle perforation line extending across the first seal;

whereby a handle for the bag can be formed from the outer and inner sheet portions by tearing the first bag separating perforation line, and tearing the handle perforation line wherein second bag separating perforation line is located nearer to the second seal than the first seal, the roll of bags being free of any handle perforation line intersecting the second bag separating perforation line.

2. The roll of separable bags as set forth in claim 1, wherein the second segment of the handle perforation line extends across the first bag separating perforation line.

3. The roll of separable bags as set forth in claim 2, wherein the handle perforation line further comprises a third segment beginning at a start location nearer to one of the longitudinal edges of the outer and inner sheet portions than the other of the longitudinal edges of the outer and inner sheet portions on the opposite side of the bag separating perforation line from the start location of the first segment, the third segment extending from the start location of the third segment generally toward the other of the longitudinal edges of the outer and inner sheet portions and intersecting the second segment, whereby tearing the bag separating perforation line and the handle perforation line forms a handle associated with a first bag of the separable bags of the roll and a handle associated with a second bag of the separable bags of the roll.

4. The roll of separable bags as set forth in claim 3, wherein the handle perforation line constitutes a first handle perforation line, the roll of separable bags including a second handle perforation line including a first segment beginning at a start location on an opposite side of the outer and inner sheet portions from the start location of the first segment of the first handle perforation line, and a second segment extending from the first segment remote from the start location of the second handle perforation line, the second segment extending generally lengthwise of the outer and inner sheet portions, and intersecting the bag separating perforation line.

5. The roll of separable bags as set forth in claim 4, wherein the second handle perforation line further includes a third segment beginning at a start location on an opposite side of the outer and inner sheet portions from the start location of the third segment of the first handle perforation line and on the opposite side of the first bag separating perforation line from the start location of the first segment of the second handle perforation line, the third segment extending from the start location of the third segment of the second handle perforation line generally toward the other of the longitudinal edges of the outer and inner sheet portions and intersecting the second segment of the second handle perforation line.

6. The roll of separable bags as set forth in claim 5, wherein the first segment and the third segment each turns back upon itself adjacent to the respective start location to inhibit tear propagation into the outer and inner sheet portions extending beyond the handle perforation line at the respective start location.

7. The roll of separable bags as set forth in claim 1, further comprising gusset sheet portions connecting the outer sheet portion to the inner sheet portion.

8. The roll of separable bags as set forth in claim 1, further comprising a third seal extending widthwise of the outer and inner sheet portions nearer to the first seal than the second seal.

9. The roll of separable bags as set forth in claim 8, wherein the bag separating perforation line is located between the first seal and the third seal.

10. A roll of separable bags comprising:

an outer sheet portion having a length, a width and opposite longitudinal edges;

an inner sheet portion connected to the outer sheet portion, the inner sheet portion having a length, a width and opposite longitudinal edges, the inner sheet portion being arranged in the roll generally opposite to the outer sheet portion;

a first seal extending widthwise of and interconnecting the outer and inner sheet portions;

a second seal extending widthwise of the outer and inner sheet portions, the second seal being spaced lengthwise of the outer and inner sheet portions from the first seal;

a first bag separating perforation line extending widthwise of the outer and inner sheet portions and configured for separating a bag from the roll of separable bags by tearing the bag separating perforation line, the first bag separating perforation line being located closer to the first seal than to the second seal;

a second bag separating perforation line extending widthwise of and interconnecting the outer and inner sheet portions and configured for separating another bag from the roll of separable bags by tearing the second bag separating perforation line, the second bag separating perforation line being located closer to the second seal than to the first seal;

a handle perforation line including a first segment beginning at a start location nearer to one of the longitudinal edges of the outer and inner sheet portions than the other of the longitudinal edges of the outer and inner sheet portions, the handle perforation line including the first segment extending from the start location generally toward the other of the longitudinal edges of the outer and inner sheet portions, and a second segment extending from the first segment remote from the start location, the second segment extending generally lengthwise of the outer and inner sheet portions, and intersecting the first bag separating perforation line, the second segment of the handle perforation line extending across the first seal and extending across the first bag separating perforation line;

the handle perforation line further including a third segment beginning at a start location nearer to one of the longitudinal edges of the outer and inner sheet portions than the other of the longitudinal edges of the outer and inner sheet portions on the opposite side of the bag separating perforation line from the start location of the first segment, the third segment extending from the start location of the third segment generally toward the other of the longitudinal edges of the outer and inner sheet portions and intersecting the second segment, whereby tearing the bag separating perforation line and the handle perforation line forms a handle associated with a first bag of the separable bags of the roll and a handle associated with a second bag of the separable bags of the roll;

wherein the handle perforation line constitutes a first handle perforation line, the roll of separable bags including a second handle perforation line including a first segment beginning at a start location on an opposite side of the outer and inner sheet portions from the start location of the first segment of the first handle perforation line, and a second segment extending from the first segment remote from the start location of the second handle perforation line, the second segment extending generally lengthwise of the outer and inner sheet portions, and intersecting the bag separating perforation line whereby a handle for the bag can be formed from the outer and inner sheet portions by tearing the first bag separating perforation line, and tearing the handle perforation line;

wherein the second segment of the first handle perforation line and the second segment of the second handle perforation line are at least partially coincident.

11. A roll of separable bags comprising:

an outer sheet portion having a length, a width and opposite longitudinal edges;

an inner sheet portion connected to the outer sheet portion, the inner sheet portion having a length, a width and opposite longitudinal edges, the inner sheet portion being arranged in the roll generally opposite to the outer sheet portion;

a first seal extending widthwise of and interconnecting the outer and inner sheet portions;

a second seal extending widthwise of the outer and inner sheet portions, the second seal being spaced lengthwise of the outer and inner sheet portions from the first seal;

a first bag separating perforation line extending widthwise of the outer and inner sheet portions and configured for separating a bag from the roll of separable bags by tearing the bag separating perforation line, the first bag separating perforation line being located closer to the first seal than to the second seal;

a second bag separating perforation line extending widthwise of and interconnecting the outer and inner sheet portions and configured for separating another bag from the roll of separable bags by tearing the second bag separating perforation line, the second bag separating perforation line being located closer to the second seal than to the first seal;

a handle perforation line including a first segment beginning at a start location nearer to one of the longitudinal edges of the outer and inner sheet portions than the other of the longitudinal edges of the outer and inner sheet portions, the handle perforation line including the first segment extending from the start location generally toward the other of the longitudinal edges of the outer and inner sheet portions, and a second segment extending from the first segment remote from the start location, the second segment extending generally lengthwise of the outer and inner sheet portions, and intersecting the first bag separating perforation line, the second segment of the handle perforation line extending across the first seal;

gusset sheet portions connecting the outer sheet portion to the inner sheet portion;

whereby a handle for the bag can be formed from the outer and inner sheet portions by tearing the first bag separating perforation line, and tearing the handle perforation line;

wherein the handle perforation line includes perforations extending through one of the gusset sheet portions.

12. A roll of separable bags comprising:

an outer sheet portion having a length, a width and opposite longitudinal edges;

an inner sheet portion connected to the outer sheet portion, the inner sheet portion having a length, a width and opposite longitudinal edges, the inner sheet portion being arranged in the roll generally opposite to the outer sheet portion;

a first seal extending widthwise of and interconnecting the outer and inner sheet portions;

a second seal extending widthwise of the outer and inner sheet portions, the second seal being spaced lengthwise of the outer and inner sheet portions from the first seal;

a first bag separating perforation line extending widthwise of the outer and inner sheet portions and configured for separating a bag from the roll of separable bags by tearing the bag separating perforation line, the first bag separating perforation line being located closer to the first seal than to the second seal;

a second bag separating perforation line extending widthwise of and interconnecting the outer and inner sheet portions and configured for separating another bag from the roll of separable bags by tearing the second bag separating perforation line, the second bag separating perforation line being located closer to the second seal than to the first seal;

a third seal extending widthwise of the outer and inner sheet portions nearer to the first seal than the second seal;

a handle perforation line including a first segment beginning at a start location nearer to one of the longitudinal edges of the outer and inner sheet portions than the other of the longitudinal edges of the outer and inner sheet portions, the handle perforation line including the first segment extending from the start location generally toward the other of the longitudinal edges of the outer and inner sheet portions, and a second segment extending from the first segment remote from the start location, the second segment extending generally lengthwise of the outer and inner sheet portions, and intersecting the first bag separating perforation line;

wherein the second segment of the handle perforation line extends across the first seal and the third seal.

13. A roll of separable bags comprising:

an outer sheet portion having a length, a width and opposite longitudinal edges;

an inner sheet portion connected to the outer sheet portion, the inner sheet portion having a length, a width and opposite longitudinal edges, the inner sheet portion being arranged in the roll generally opposite to the outer sheet portion;

a first seal extending widthwise of and interconnecting the outer and inner sheet portions;

a second seal extending widthwise of the outer and inner sheet portions, the second seal being spaced lengthwise of the outer and inner sheet portions from the first seal;

a first bag separating perforation line extending widthwise of the outer and inner sheet portions and configured for separating a bag from the roll of separable bags by tearing the bag separating perforation line, the first bag separating perforation line being located closer to the first seal than to the second seal;

a second bag separating perforation line extending widthwise of and interconnecting the outer and inner sheet portions and configured for separating another bag from the roll of separable bags by tearing the second bag separating perforation line, the second bag separating perforation line being located closer to the second seal than to the first seal;

a handle perforation line including a first segment beginning at a start location nearer to one of the longitudinal edges of the outer and inner sheet portions than the other of the longitudinal edges of the outer and inner sheet portions, the handle perforation line including the first segment extending from the start location generally toward the other of the longitudinal edges of the outer and inner sheet portions, and a second segment extending from the first segment remote from the start location, the second segment extending generally lengthwise of the outer and inner sheet portions, and intersecting the first bag separating perforation line, the first segment turning back on itself adjacent to the start location to inhibit tear propagation into the outer and inner sheet portions extending beyond the handle perforation line at the start location;

whereby a handle for the bag can be formed from the outer and inner sheet portions by tearing the first bag separating perforation line, and tearing the handle perforation line.

14. A method for forming a web of separable bags comprising the steps of:

forming a tube from a polymeric material having a length and a width and including an outer sheet portion including opposite longitudinal edges and an inner sheet portion generally opposite the outer sheet portion, the inner sheet portion including opposite longitudinal edges;

forming seals extending widthwise across and interconnecting the outer and inner sheet portions at locations spaced apart longitudinally of the tube, forming seals including forming a first seal extending widthwise of and interconnecting the outer and inner sheet portions, forming a second seal extending widthwise of the outer an inner sheet portions, the second seal being spaced lengthwise of the outer and inner sheet portions from the first seal, and forming a third seal extending widthwise of the outer and inner sheet portions nearer to the first seal than the second seal;

perforating the tube in a widthwise direction to form bag separating perforation lines at locations spaced apart longitudinally of the tube;

perforating the tube to form handle perforation lines distinct from the bag separating perforation lines, one of the handle perforation lines and one of the bag separating perforation lines together defining a handle formed by tearing said one handle perforation line and said one bag separating perforation line, perforating the tube to form handle perforation lines including perforating a first segment beginning at a start location nearer to one of the longitudinal edges of the outer and inner sheet portions than the other of the longitudinal edges of the outer and inner sheet portions, the handle perforation line including the first segment extending from the start location generally toward the other of the longitudinal edges of the outer and inner sheet portions, and a second segment extending from the first segment remote from the start location, the second segment extending generally lengthwise of the outer and inner sheet portions, intersecting the first bag separating perforation line, and extending across the first seal and the third seal.

15. The method for forming a web of separable bags as set forth in claim 14, wherein forming the tube comprises forming gusset sheet portions connecting the outer sheet portions and inner sheet portions, and perforating the tube to form handle perforation lines includes perforating the gusset sheet portions.

16. The method for forming a web of separable bags as set forth in claim 14, wherein the step of perforating the tube to form handle perforation lines comprises arranging each handle perforation line so that when the handle is formed by tearing said one bag separating perforation line and said one handle perforation line, no scrap is separated from the tube.

17. The method for forming a web of separable bags as set forth in claim 14 further wherein forming seals comprises forming pairs of seals associated with each of the bag separating perforation lines.

18. The method for forming a web of separable bags as set forth in claim 14, wherein perforating the tube to form handle perforation lines comprises shaping each handle perforation line to resist propagation of tears in the tube beyond and end of the handle perforation line.

19. The method for forming a web of separable bags as set forth in claim 14 wherein perforating the tube to form handle perforation lines further comprises forming the first segment so that the first segment turns back upon itself adjacent to a start location to inhibit tear propagation into the outer and inner sheet portions extending beyond the handle perforation line at the start location.

* * * * *